United States Patent Office 3,344,477
Patented Oct. 3, 1967

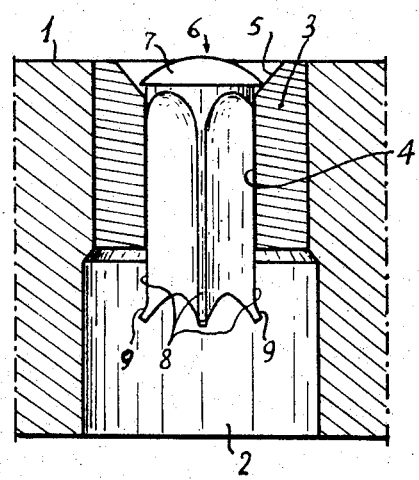
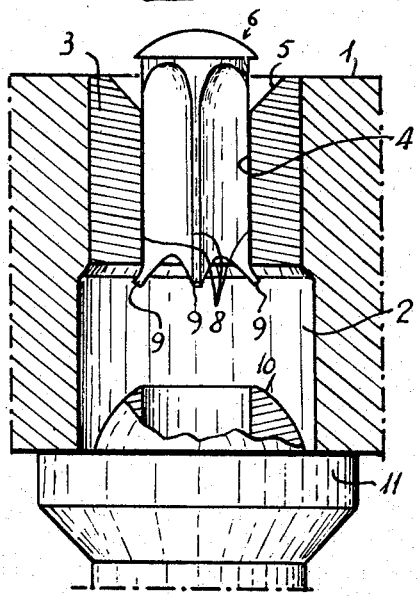
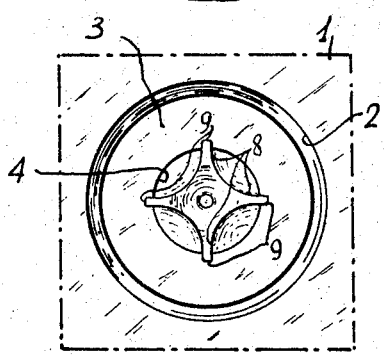
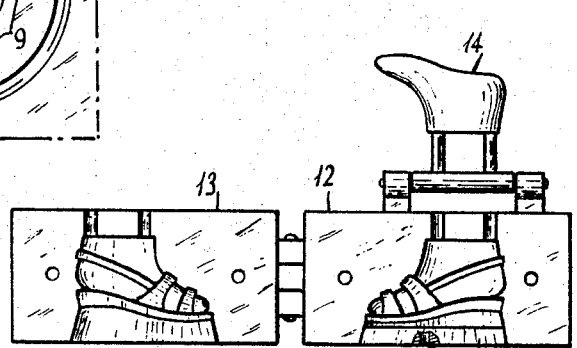
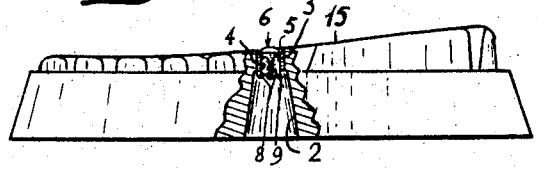

3,344,477
VALVE FOR MOLDING OF PLASTIC UNDER PRESSURE
Edmond Stokis, 6 Square de la Gascogne, Paris, France
Filed Oct. 5, 1964, Ser. No. 401,495
3 Claims. (Cl. 18—34)

ABSTRACT OF THE DISCLOSURE

A non-return valve for plastic injection molding has a valve member having a head that has a sharp circular edge that seats on a conical portion of the valve body, and at least three longitudinal ribs which engage with minimum clearance the bore of the valve body, the recesses between the ribs communicating with the underside of the sharp edge of the head, the ends of the ribs opposite the head being enlarged to retain the valve member reciprocably in the bore between the head and the enlarged ends of the ribs.

---

The invention relates to improvements in and/or to the molding of plastic materials under pressure.

The molding of plastic materials under pressure is of large use. However, till now, the molded articles manufactured by means of injection or extruding machines are not fully satisfactory. In fact, the perfect plastification of a thermoplastic material requires high heating; but higher is the temperature of the injected material, greater are the retractions of this material, during the solidification process; therefrom it results shrinkages and appearance defects. Further, the thermoplastic material injected under pressure tends to go out through the mold injection inlet, after injection; whereby the appearance defects of the molded article are still more increased.

The object of this invention is the elimination of the foregoing disadvantages, by maintaining the pressure of the thermoplastic material in the mold and preventing this material from flowing out the mold after injection; thus any appearance defect is suppressed.

In order to improve the molding by injection under pressure of all the injectable materials, natural and synthetic rubbers inclusively, this invention relates to a non-return valve adapted to be fitted in a mold member and having a head provided with sharp edge and rising above a part having at least three longitudinal ribs which enlarge opposite said head and engage with minimum clearance the bore of a passage widened near said head; the valve stroke being limited on the one side by the abutment of the head sharp edge against the passage widening and, on the other side, by the abutment of the rib enlargement against the passage edge opposite said widening.

According to the invention, said head is a spherical calotte, said passage is cylindrical and said passage widening is revolving frustoconical and coaxial with the passage bore.

In conformity with this invention, said passage is formed by the bore of a tubular piece fixed within the injection inlet of a mold member.

Of the accompanying drawing which illustrates one embodiment of the invention:

FIGURE 1 is a transverse partial view of a mold element in section on the axis of the valve, the latter being closed.

FIGURE 2 is a view corresponding to that of FIGURE 1, but with the valve open.

FIGURE 3 is an under view, corresponding to FIGURE 1.

FIGURE 4 is a lateral view of a mold assembly for shoe making, and

FIGURE 5 is a lateral view, at larger scale, of a mold element shown in FIGURE 4.

With reference to FIGURES 1 to 3, 1 denotes a mold element, 2 a hole machined in the element 1, 3 a tubular piece coaxially fixed in the hole 2. The tubular piece 3 has a cylindrical bore or passage 4 and an upper frustoconical widening 5. Within the bore 4 is mounted a valve body 6 which comprises a head 7 whose shape is a spherical calotte and a part provided with ribs 8. The ribs 8 are regularly distributed and enlarged opposite the head 7. At the peripheral surface of the valve part, the ribs 8 engage the bore 4 of the piece 3, with the minimum clearance allowing the free sliding of the valve body axially within the bore 4.

By way of example, FIGURE 4 shows a mold adapted to the shoe making. This mold has two portions 12 and 13 respectively hinged to each other, an upper element 14 articulated on the portion 12, and a lower element 15 removable. The portions 12 and 13 are provided with corresponding internal cavities for molding the upper wall of the shoe and the lower element 15 is provided with internal cavities for molding the embossments of the shoe sole. Before the closing of the mold, the upper element 14 is pivoted in order to take place within the corresponding internal cavities of the portions 12 and 13 and to mold the internal surfaces defining the inner volume of the shoe.

FIGURE 5 illustrates, at greater scale, the lower element 15 and, as it may be seen in the part broken away, this element 15 has mounted thereon the non-return valve shown in FIGURES 1 to 3.

The non-return valve, according to the invention, operates as follows. The mold being closed and all the elements thereof being in position of molding, the end of an injection nozzle 10 is engaged within the lower or outer part of the hole 2, so that the collar 11 of this nozzle is tightly applied on the face of the element 1 or 15 in which opens the hole 2. The thermoplastic material, in melting condition, is injected by the nozzle 10 through the bore 4, whereby is caused the sliding up or opening of the valve body 6; then the thermoplastic material flowing between the ribs 8 fills the mold. After mold filling, injection is stopped and the nozzle 10 brought away and, as the injection has been performed under pressure, the valve closes, since the outer aperture of the hole 2 is under atmosphere pressure. After solidification, the material remaining in the hole 2 is easily withdrawn, as the sharp edge of the head 7 has cut the upper end of the material residue, the portions of which disposed between the ribs 8 are readily removable, because of the small clearance provided between the peripheral surface of the ribs 8 and the internal face of the bore 4.

As the solidification of the thermoplastic material is carried out under pressure within the mold, all the interstices thereof are fully filled and, after taking from the mold, the cast article has no defect caused by material shrinking.

Moreover, as the valve, according to the invention, is allowing an injection at a properly high temperature, the plastification of the injected material is complete.

The non-return valve, according to the invention, requires no intermediate guide member; such a guide member would be an obstacle for the full removal of the remaining material. Further because of the small clearance, it does not occur any penetration of injected material between the peripheral surface of the ribs 8 and the bore 4; whereby the removal of the remaining injected material is made still easier.

The valve is adapted for its mounting in the injection passages of the whole of the molds for injectable materials, thermoplastic, elastomer et al. and the manufacture of shoes must not be regarded as a limitation of the invention.

For the fixation of the tubular piece 3 in the hole 2 by any appropriate means, might be substituted a machining of this hole, so that the latter includes a bore or passage identical to the bore or passage 4, a widening such as 5, and a shoulder in the place of the face of the piece 3 opposite the widening.

Although four ribs are shown, the number of the ribs may be greater or smaller.

Further, the head 7 shown in form of a spherical calotte might be in shape of a non-spherical calotte, for instance of a flat cap rectangular or trapezoidal in axial section, provided that its edge, which is in cooperating relation with the widening, is sharp.

*Summary*

In order to improve the molding by injection under pressure of the whole of the injectable material, including natural and synthetic rubbers, the invention relates to a non-return valve adapted to be fitted in a mold element and characterized in that it includes a head provided with sharp edge and rising above a part having at least three longitudinal ribs which enlarge opposite said head and engage with minimum clearance the bore of a passage widened near said head; the valve stroke being defined, on the one side, by the abutment of said head sharp edge against the passage widening and, on the other side, by the abutment of the rib enlargement against the passage edge opposite said widening.

The non-return valve presents also the following characteristics, separately or in combination:

(a) Said head is a spherical calotte, said passage is cylindrical and the widening of said passage is revolving frustoconical and coaxial with the bore of said passage.

(b) Said passage is the bore of a tubular piece fixed within the injection inlet (or inlets) of a mold element to be fitted.

I claim:
1. A non-return valve for plastic injection molding, comprising a valve body having a bore therethrough with a tapered enlargement at one end, a non-return valve member reciprocable in the bore and having a head having a sharp edge that engages said tapered enlargement with line contact, said valve member having a plurality of longitudinally extending ribs thereon which engage with minimum clearance the bore of the valve body and which define between them longitudinally extending passages that communicate with the underside of said head, said ribs being enlarged radially outwardly at their ends opposite said head so as to retain said body in said bore between said head and said enlarged rib ends, said head and said enlarged ends being spaced apart from each other a distance sufficient to permit substantial reciprocal movement of said valve member in said bore.

2. A non-return valve as claimed in claim 1, said tapered enlargement being conical.

3. A non-return valve as claimed in claim 1, said bore being cylindrical, said ribs being in sliding contact with said bore along most of their length.

References Cited

UNITED STATES PATENTS

| | | | |
|---|---|---|---|
| 2,396,406 | 3/1946 | Anderson | 18—2 X |
| 2,629,897 | 3/1953 | Mahla | 18—2 |
| 2,770,011 | 11/1956 | Kelly | 18—42 X |
| 2,892,214 | 6/1959 | McCarthy | 18—4 X |
| 3,151,374 | 10/1964 | Kersten | 18—2 X |

FOREIGN PATENTS 922,788   4/1963   Great Britain.

J. SPENCER OVERHOLSER, *Primary Examiner.*

J. HOWARD FLINT, JR., *Examiner.*